United States Patent [19]

Reichel et al.

[11] Patent Number: 4,550,194

[45] Date of Patent: * Oct. 29, 1985

[54] PROCESS FOR THE PREPARATION OF POLYETHER-ESTER POLYOLS

[75] Inventors: Curtis J. Reichel, Wyandotte; Robert J. Hartman, Southgate, both of Mich.

[73] Assignee: BASF Wyandotte Corporation, Wyandotte, Mich.

[*] Notice: The portion of the term of this patent subsequent to Aug. 13, 2002 has been disclaimed.

[21] Appl. No.: 426,311

[22] Filed: Sep. 29, 1982

Related U.S. Application Data

[63] Continuation-in-part of Ser. No. 364,336, Apr. 1, 1982.

[51] Int. Cl.$^4$ .................. C07C 67/08; C07C 67/26
[52] U.S. Cl. .................. 560/200; 260/465.6; 502/170; 521/137; 525/41; 525/43; 525/450
[58] Field of Search .................. 260/465.6; 560/200; 521/137; 525/41, 43, 450; 252/431 C; 502/170

[56] References Cited

U.S. PATENT DOCUMENTS

| | | | |
|---|---|---|---|
| Re. 29,014 | 10/1976 | Pizzini et al. | 524/762 |
| 3,374,208 | 3/1968 | Seiner et al. | 524/43 X |
| 3,931,092 | 1/1976 | Ramlow et al. | 524/43 X |
| 3,953,393 | 4/1976 | Ramlow et al. | 526/218 |
| 4,014,846 | 3/1977 | Ramlow et al. | 524/43 X |
| 4,093,573 | 6/1978 | Ramlow et al. | 524/43 X |
| 4,144,395 | 3/1979 | Murphy et al. | 560/200 |
| 4,268,686 | 5/1981 | Schafer et al. | 560/91 |

*Primary Examiner*—Michael L. Shippen
*Assistant Examiner*—Vera C. Clarke
*Attorney, Agent, or Firm*—Norbert M. Lisicki

[57] ABSTRACT

Polyether-ester polyols are prepared by reacting a polyether polyol, maleic anhydride and an alkylene oxide in the presence of a catalyst selected from the group consisting of calcium naphthenate and cobalt naphthenate. These polyols may be used in preparing polyurethane products.

8 Claims, No Drawings

PROCESS FOR THE PREPARATION OF POLYETHER-ESTER POLYOLS

This application is a continuation-in-part of application Ser. No. 364,336, filed Apr. 1, 1982.

BACKGROUND OF THE INVENTION

1. Field of the Invention

The present invention relates to a process for the preparation of polyether-ester polyols. More particularly, the invention relates to the preparation of these polyols by reacting a polyether polyol, maleic anhydride and an alkylene oxide in the presence of an effective amount of a catalyst selected from the group consisting of calcium naphthenate and cobalt naphthenate.

2. Description of the Prior Art

The preparation of polyether-ester polyols by the reaction of an alkylene oxide with a half acid ester obtained by the reaction of a polyol with an unsaturated acid anhydride is well known in the art as taught in U.S. Pat. Nos. 3,931,092, 4,014,846, 4,093,573 and 4,144,395. These patents relate to uncatalyzed or trialkylaminecatalyzed reactions. U.S. Pat. No. 3,374,208 teaches the use of various metal catalysts for the preparation of polyesters. The prior art, however, does not teach the preparation of polyether-ester polyols having an acidity of less than 5 mg KOH/gm of sample employing the process of the instant invention.

SUMMARY OF THE INVENTION

This invention is directed to an improvement in the process for preparing polyether-ester polyols comprising reacting a polyether polyol, maleic anhydride, and an alkylene oxide in the presence of an effective amount of a catalyst selected from the group consisting of calcium naphthenate and cobalt naphthenate.

DESCRIPTION OF THE PREFERRED EMBODIMENTS

In the preferred embodiment for the preparation of these polyether-ester polyols, the improvement comprises preparing the polyols by the reaction of a polyoxyalkylene polyether polyol, maleic anhydride to form a half acid ester and an alkylene oxide to obtain a product having an acid number of about 5 mg KOH/gram or less by conducting the reaction between the polyoxyalkylene polyether polyol and the anhydride and the following reaction with the alkylene oxide in the presence of an effective amount of a catalyst selected from the group consisting of calcium napthenate and cobalt naphthenate at temperatures from about 75° C. to about 175° C., preferably at about 125° C.

The concentration of catalyst which may be employed ranges from 0.005 to 0.5 weight percent based on the weight of polyol mixture. The equivalent weight of the resulting polyether ester polyol may vary from 1000 to 10,000, preferably from 2000 to 6000. The use of these catalysts has been found to promote the isomerization of the maleate to fumarate even at temperatures as low as 125° C. The relative concentrations of maleate and fumarate unsaturation may be readily measured by employing nuclear magnetic resonance. The unsaturation values may range from about 0.05 to about 3.0 moles of unsaturation per mole of polyol preferably from 0.3 to 1.0 moles of unsaturation per mole of polyol.

The alkylene oxides which may be employed for the preparation of the polyether-ester polyols include ethylene oxide, propylene oxide, butylene oxide, amylene oxide and mixtures of these oxides.

Representative polyols which may be employed in the subject invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalo-hydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

The unsaturated polyols of the instant invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, isocyanate or epoxy group as a reactant in the preparation of the conventional polyol. Representative of such organic compounds include unsaturated mono- and polycarboxylic acids and anhydrides such as maleic acid and maleic anhydride, fumaric acid, crotonic acid and crotonic anhydride, propenyl succinic anhydride, acrylic acid, acryoyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene- 3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). The preferred compound is maleic anhydride. If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 mg KOH/gm of sample or less.

In addition to being useful in the preparation of polyurethanes, the polyols prepared in accordance with the process of the subject invention find utility as precursors in the preparation of graft polymer dispersions as disclosed in U.S. Pat. Nos. 3,652,658, 3,875,258, 3,950,317 and 3,953,393.

The following examples illustrate the nature of the invention. All parts are by weight unless otherwise indicated The following abbreviations are employed in the examples below:

Polyol A is a trimethylolpropane, propylene oxide, ethylene oxide adduct containing a 15 percent ethylene oxide cap and having a hydroxyl number of 25.

Polyol B is a glycerine, propylene oxide, ethylene oxide adduct containing a 15 percent ethylene oxide cap and having a hydroxyl number of 25.

Polyol C is a trimethylolpropane, propylene oxide, ethylene oxide adduct containing a 5 percent ethylene oxide cap and having a hydroxyl number of 26.5.

Polyol D is a glycerine, propylene oxide adduct having a hydroxyl number of 25.

Polyol E is a glycerine, propylene oxide, ethylene oxide heteric adduct containing 25 percent ethylene oxide and having a hydroxyl number of 18.

Polyol F is a glycerine, heteric adduct of equimolar amounts of ethylene and butylene oxide and having a hydroxyl number of 25.

Polyol G is a glycerine, propylene oxide, ethylene oxide adduct containing a 15 percent ethylene oxide block and having a hydroxyl number of 25.

Polyol H is a trimethylolpropane, propylene oxide, ethylene oxide heteric adduct containing 40 percent ethylene oxide and having a hydroxyl number of 33.

Polyol I is a glycerine, propylene oxide, ethylene oxide heteric adduct containing 7 percent ethylene oxide and having a hydroxyl number of 25.

Polyol J is a glycerine, propylene oxide, ethylene oxide heteric adduct containing 15 percent ethylene oxide and having a hydroxyl number of 25.

Polyol K is a pentaerythritol, propylene oxide, ethylene oxide adduct containing a 15 percent ethylene oxide cap and having a hydroxyl number of 25.

Catalyst A is zinc neodecanoate.
Catalyst B is calcium naphthenate.
Catalyst C is copper naphthenate.
Catalyst D is cobalt naphthenate.

Examples 1–51

The following general procedure was employed in Examples 1 to 51. A 3-liter round-bottom flash with a stirrer, thermometer and gas inlet was charged with 2000 grams of the indicated polyol, the amount of maleic anhydride as indicated and the type and amount of catalyst as shown. The contents were heated to 125° C. and allowed to react for about 1 hour in a nitrogen atmosphere. This intermediate was transferred to a 1 gallon steam heated stainless steel autoclave. After heating the contents to 125° C. and pressurizing with nitrogen, 96 grams of ethylene oxide were added over 1 hour and the reaction allowed to continue for 8 hours. The product was discharged from the reactor, and the volatiles were stripped off at 105° C. for 1 hour at <10 mm Hg. The resulting physical properties of the products are as shown in the Table. The temperatures ranged from 115° C. to 150° C. The reaction times ranged from 2 to 10 hours.

TABLE

| Examples | Maleic Anhydride, Equivalents* | Catalyst | Catalyst Level, ppm | OH No. | Acid No. | Saponification No. | Unsaturation mole/mole** | Viscosity cps, 25° C. | Polyol |
|---|---|---|---|---|---|---|---|---|---|
| 1 | 0.8 | A | 800 | 25.5 | 0.57 | 22.2 | 0.6 M | 11,900 | A |
| 2 | 0.8 | B | 800 | 25.2 | 0 | 13.8 | 0.4 F | 12,200 | A |
| 3 | 0.8 | C | 800 | 22.2 | 1.3 | 18.6 | 0.6 M | 2,760 | A |
| 4 | 0.8 | D | 800 | 22.5 | 0.05 | 15.6 | 0.35 F/0.1 M | 15,250 | A |
| 5 | 0.8 | B | 800 | 26.3 | 0.22 | 15.1 | 0.45 F | 9,425 | B |
| 6 | 1.0 | B | 800 | 21.6 | 0 | 19.2 | 0.40 F/0.1 M | 17,290 | B |
| 7 | 1.5 | B | 800 | 23.9 | 0 | 27.1 | — | 100,000 | B |
| 8 | 0.8 | B | 400 | 24.0 | 0 | 11.3 | 0.37 F | 8,485 | B |
| 9 | 0.8 | B | 200 | 21.6 | 0 | 11.6 | 0.48 F | 7,370 | B |
| 10 | 0.8 | B | 100 | 20.7 | 0 | 16.3 | 0.55 F | 11,390 | B |
| 11 | 0.8 | B | 200 | 22.3 | 0 | 16.7 | 0.48 F | 8,030 | B |
| 12 | 0.8 | B | 200 | 17.9 | 0.8 | 16.6 | 0.35 F | 16,830 | B |
| 13 | 0.8 | B | 200 | 21.7 | 0 | 19.3 | 0.55 F | 10,230 | B |

TABLE-continued

| Examples | Maleic Anhydride, Equivalents* | Catalyst | Catalyst Level, ppm | OH No. | Acid No. | Saponification No. | Unsaturation mole/mole** | Viscosity cps, 25° C. | Polyol |
|---|---|---|---|---|---|---|---|---|---|
| 14 | 0.75 | B | 200 | 24.8 | 0 | 16.9 | 0.50 F | 8,360 | B |
| 15 | 0.85 | B | 200 | 25.6 | 0 | — | 0.50 F | 9,430 | B |
| 16 | 0.9 | B | 200 | 21.2 | 0 | 24.0 | 0.50 F | 12,070 | B |
| 17 | 0.8 | B | 200 | 23.4 | 0 | 17.2 | 0.55 F | 10,000 | B |
| 18 | 1.0 | B | 200 | 20.9 | 0 | 30.5 | 0.55 F | 18,520 | B |
| 19 | 1.0 | B | 200 | 21.0 | 0.4 | 41.5 | 0.45 F/0.1 M | 24,880 | B |
| 20 | 0.8 | B | 200 | 23.8 | 0 | 16.5 | 0.15 F/0.45 M | 3,800 | B |
| 21 | 0.8 | B | 200 | 22.0 | 0 | 17.7 | 0.55 F | 12,200 | B |
| 22 | 0.8 | B | 50 | — | 0 | — | 0.65 M | 2,530 | B |
| 23 | 0.8 | B | 200 | — | 0 | — | 0.5 F | 9,200 | B |
| 24 | 0.8 | B | 200 | — | 0 | — | 0.4 F | 14,400 | B |
| 25 | 0.8 | B | 300 | — | 0 | — | 0.5 F | 8,780 | B |
| 26 | 0.8 | B | 200 | — | 0 | — | 0.45 F | 7,720 | B |
| 27 | 0.8 | B | 200 | — | 0 | — | 0.45 F | 8,960 | B |
| 28 | 1.0 | B | 200 | — | 0 | — | 0.7 F | 14,160 | B |
| 29 | 1.0 | B | 50 | — | 0 | — | 0.9 F | 2,660 | B |
| 30 | 0.8 | B | 200 | 21.8 | 0.3 | 20.4 | 0.5 F | 10,800 | B |
| 31 | 1.0 | B | 50 | 22.1 | 0.1 | 25.3 | 0.3 F/0.45 M | 9,920 | B |
| 32 | 1.0 | B | 50 | 17.8 | 7.3 | 23.7 | 1.0 M | 2,580 | B |
| 33 | 1.0 | B | 50 | 22.0 | 6.4 | 23.8 | 0.95 M | 2,620 | B |
| 34 | 1.0 | B | 50 | 21.5 | 2.5 | 24.3 | 0.05 F/0.95 M | 2,710 | B |
| 35 | 1.0 | B | 50 | 18.6 | 0.4 | 24.8 | 0.6 F/0.1 M | 12,500 | B |
| 36 | 1.0 | B | 50 | 23.2 | 0.7 | 24.5 | 1.0 M | — | B |
| 37 | 0.8 | B | 200 | 23.3 | 0.1 | 20.3 | 0.5 F | — | C |
| 38 | 0.8 | B | 200 | 21.3 | 0.1 | 19.0 | 0.5 F | 7,410 | C |
| 39 | 0.8 | B | 800 | 25.6 | 0.1 | 24.4 | 0.5 F | 6,750 | C |
| 40 | 0.8 | B | 200 | 21.5 | 0.3 | 16.5 | 0.45 F | — | C |
| 41 | 0.8 | B | 200 | 23.9 | 0.2 | 20.4 | 0.3 F | 3,780 | D |
| 42 | 0.8 | B | 200 | 24.3 | 0.1 | 19.1 | 0.5 F | 4,790 | B |
| 43 | 0.8 | B | 200 | 21.9 | 0.06 | 14.5 | 0.1 F/0.1 M | — | D |
| 44 | 0.8 | B | 200 | 18.4 | 0.2 | 16.8 | 0.9 M | 4,990 | E |
| 45 | 0.8 | B | 200 | 23.3 | 1.1 | 12.5 | — | 2,180 | F |
| 46 | 0.8 | B | 200 | 22.2 | 0.2 | 21.2 | 0.2 M | 4,380 | G |
| 47 | 0.8 | B | 200 | 24.7 | 0.2 | 25.8 | 0.3 F | 29,360 | H |
| 48 | 0.8 | B | 200 | 23.1 | 1.1 | 19.5 | 0.7 M | 2,160 | I |
| 49 | 0.8 | B | 200 | 23.0 | 1.6 | 16.9 | 0.5 M | 2,090 | J |
| 50 | 0.8 | B | 200 | 21.3 | 0.5 | 19.0 | 0.8 F/0. | — | D |
| 51 | 0.8 | B | 200 | 21.7 | 0.3 | 19.0 | 0.6 F | 22,400 | K |

*equivalents of maleic anhydride per mole of polyol.
**moles of induced unsaturation per mole of polyol where M is the amount of maleate unsaturation and F is the amount of fumarate unsaturation.

The embodiments of the invention in which an exclusive privilege or property is claimed are defined as follows:

1. In a process for the preparation of polyether-ester polyols by the reaction of a polyether polyol and an organic compound containing both ethylenic unsaturation and an anhydride group wherein said reaction comprises reacting
   (a) a polyether polyol,
   (b) an organic compound containing both ethylenic unsaturation, and an anhydride group forming a half ester,
   (c) further reacting with an alkylene oxide to obtain a product with an acid number of 5 mg KOH/gm or less, the improvement which comprises conducting said reactions in the presence of an effective amount of a catalyst selected from the group consisting of calcium naphthenate and cobalt naphthenate.

2. The process of claim 1 wherein the concentration of the catalyst employed is from 0.005 to 0.5 weight percent based on the weight of polyol.

3. The process of claim 1 wherein the polyether polyol is the reaction product of a polyhydric alcohol and an alkylene oxide selected from the group consisting of ethylene oxide, propylene oxide and butylene oxide.

4. The process of claim 1 wherein the alkylene oxide is ethylene oxide.

5. The process of claim 1 wherein the alkylene oxide is propylene oxide.

6. The process of claim 1 wherein the reaction temperature is from about 75° C. to about 175° C.

7. The process of claim 1 wherein the polyether-ester polyol contains fumarate unsaturation.

8. The process of claim 1 wherein the organic compound is maleic anhydride.

* * * * *